US011942259B2

(12) United States Patent
Yoneda

(10) Patent No.: US 11,942,259 B2
(45) Date of Patent: Mar. 26, 2024

(54) ELECTRONIC COMPONENT

(71) Applicant: Murata Manufacturing Co., Ltd., Kyoto-fu (JP)

(72) Inventor: Masayuki Yoneda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 192 days.

(21) Appl. No.: 17/541,993

(22) Filed: Dec. 3, 2021

(65) Prior Publication Data

US 2022/0093318 A1 Mar. 24, 2022

Related U.S. Application Data

(63) Continuation of application No. 15/382,992, filed on Dec. 19, 2016, now Pat. No. 11,222,743, which is a (Continued)

(30) Foreign Application Priority Data

Jul. 8, 2014 (JP) ................................ 2014-140232

(51) Int. Cl.
*H01F 27/28* (2006.01)
*H01F 17/00* (2006.01)
(Continued)

(52) U.S. Cl.
CPC ..... *H01F 27/2804* (2013.01); *H01F 17/0013* (2013.01); *H01F 27/29* (2013.01); (Continued)

(58) Field of Classification Search
CPC ............... H01F 17/0013; H01F 27/292; H01F 27/2804; H01F 2017/002; (Continued)

(56) References Cited

U.S. PATENT DOCUMENTS

2008/0257488 A1* 10/2008 Yamano ................ H01F 41/122
156/274.2
2011/0074537 A1 3/2011 Nakatsuji
(Continued)

FOREIGN PATENT DOCUMENTS

CN 103219129 A 7/2013
JP 2001-085244 A 3/2001
(Continued)

OTHER PUBLICATIONS

International Search Report issued in PCT/JP2015/069250; dated Sep. 8, 2015.
Written Opinion issued in PCT/JP2015/069250; dated Sep. 8, 2015.

*Primary Examiner* — Tszfung J Chan
(74) *Attorney, Agent, or Firm* — Studebaker & Brackett PC

(57) ABSTRACT

An electronic component includes: a multilayer body; an inductor constituted of a plurality of inductor conductor layers and a via hole conductor, the inductor having a helical shape; a first outer electrode provided on a first end surface formed by contiguous outer edges of the insulation layers; and a second outer electrode provided on a second end surface. The plurality of inductor conductor layers have a first inductor conductor layer connected to the first outer electrode, and a second inductor conductor layer adjacent to the first inductor conductor layer on another side in the lamination direction. The via hole conductor connecting the first inductor conductor layer and the second inductor conductor layer is provided closer to the first outer electrode than the second outer electrode, and when viewed in plan view from a normal direction of the first end surface, does not overlap with the first outer electrode.

5 Claims, 10 Drawing Sheets

Related U.S. Application Data continuation of application No. PCT/JP2015/069250, filed on Jul. 3, 2015.

(51) Int. Cl.

| | |
|---|---|
| ***H01F 27/29*** | (2006.01) |
| ***H01F 41/04*** | (2006.01) |
| ***H01F 41/10*** | (2006.01) |
| ***H01F 41/12*** | (2006.01) |

(52) U.S. Cl.

CPC .......... *H01F 41/043* (2013.01); *H01F 41/10* (2013.01); *H01F 41/122* (2013.01); *H01F 2017/002* (2013.01); *H01F 2017/004* (2013.01); *H01F 2027/2809* (2013.01)

(58) Field of Classification Search

CPC ............ H01F 2027/2809; H01F 5/003; H01F 2017/004; H01F 27/29

USPC ............................................. 336/200, 232

See application file for complete search history.

(56) References Cited

U.S. PATENT DOCUMENTS

| | | | | |
|---|---|---|---|---|
| 2013/0015937 | A1 | 1/2013 | Seko | |
| 2013/0187744 | A1* | 7/2013 | Seko | H01F 17/0013 336/200 |
| 2015/0102890 | A1 | 4/2015 | Nakamura et al. | |

FOREIGN PATENT DOCUMENTS

| | | | | |
|---|---|---|---|---|
| JP | 2002-134322 | A | | 5/2002 |
| JP | 2010-165973 | A | | 7/2010 |
| JP | 2010165973 | A | * | 7/2010 |
| JP | 2010165975 | A | * | 7/2010 |

* cited by examiner

ELECTRONIC COMPONENT

CROSS REFERENCE TO RELATED APPLICATIONS

This application is a Continuation of U.S. patent application Ser. 15/382,992, filed Dec. 19, 2016 which claims benefit of priority to Japanese Patent Application 2014-140232 filed Jul. 8, 2014, and to International Patent Application No. PCT/JP2015/069250 filed Jul. 3, 2015, the entire content of which is incorporated herein by reference.

TECHNICAL FIELD

The present disclosure relates to electronic components, and particularly relates to an electronic component including an inductor.

BACKGROUND

The electronic component disclosed in Japanese Unexamined Patent Application Publication No. 2012-79870 is known as an example of a past disclosure regarding an electronic component. FIG. 13 is a perspective view of an electronic component 500 disclosed in Japanese Unexamined Patent Application Publication No. 2012-79870.

The electronic component 500 includes a multilayer body 501, an inductor structure 502, and outer electrodes 508*a* and 508*b*. The multilayer body 501 has rectangular insulative sheets laminated in a front-back direction. The outer electrode 508*a* is provided spanning across a left-side end surface and a bottom surface of the multilayer body 501. The outer electrode 508*b* is provided spanning across a right-side end surface and a bottom surface of the multilayer body 501. The inductor structure 502 includes a lead conductor 503, a via hole conductor 504, an inductor conductor 505, a via hole conductor 506, and a lead conductor 507. The lead conductor 503 is connected to the outer electrode 508*a* and extends in a left-right direction. The inductor conductor 505 has an angular U-shape. The lead conductor 507 is connected to the outer electrode 508*b* and extends in the left-right direction. The via hole conductor 504 connects a right end of the lead conductor 503 and a right end of the inductor conductor 505. The via hole conductor 506 connects a left end of the lead conductor 507 and a left end of the inductor conductor 505.

SUMMARY

Incidentally, it is difficult to obtain a high Q value with the electronic component 500 disclosed in Japanese Unexamined Patent Application Publication No. 2012-79870. Specifically, the via hole conductor 504 is provided near the outer electrode 508*b*. The via hole conductor 504 has a circular cylinder shape, and thus has a large thickness (width) in an up-down direction. The via hole conductor 504 therefore opposes the outer electrode 508*b* across a broad surface area. There is a risk of a high stray capacitance arising between the via hole conductor 504 and the outer electrode 508*b* as a result. Such stray capacitance causes a drop in the Q value of the inductor structure 502. Accordingly, it is an object of the present disclosure to provide an electronic component capable of achieving a high Q value.

An electronic component according to an aspect of the present disclosure includes: a multilayer body formed by laminating a plurality of insulation layers in a lamination direction; an inductor, having a plurality of inductor conductor layers extending linearly and laminated with the insulation layers and at least one via hole conductor that passes through the insulation layer in the lamination direction and connects the plurality of inductor conductor layers, the inductor having a helical shape progressing from one side to another side in the lamination direction while winding; a first outer electrode connected to the inductor and provided on a first end surface of the multilayer body formed by contiguous outer edges of the insulation layers; and a second outer electrode connected to the inductor and provided on a second end surface of the multilayer body opposite from the first end surface. The plurality of inductor conductor layers have a first inductor conductor layer directly connected to the first outer electrode, and a second inductor conductor layer not directly connected to the first outer electrode and adjacent to the first inductor conductor layer on the other side in the lamination direction. The via hole conductor connecting the first inductor conductor layer and the second inductor conductor layer is, when viewed in plan view from the lamination direction, provided closer to the first outer electrode than the second outer electrode, and when viewed in plan view from a normal direction of the first end surface, does not overlap with the first outer electrode.

According to the present disclosure, a high Q value can be achieved.

DETAILED DESCRIPTION

An electronic component according to an embodiment of the present disclosure will be described hereinafter.

(Configuration of Electronic Component)

Figure 1:
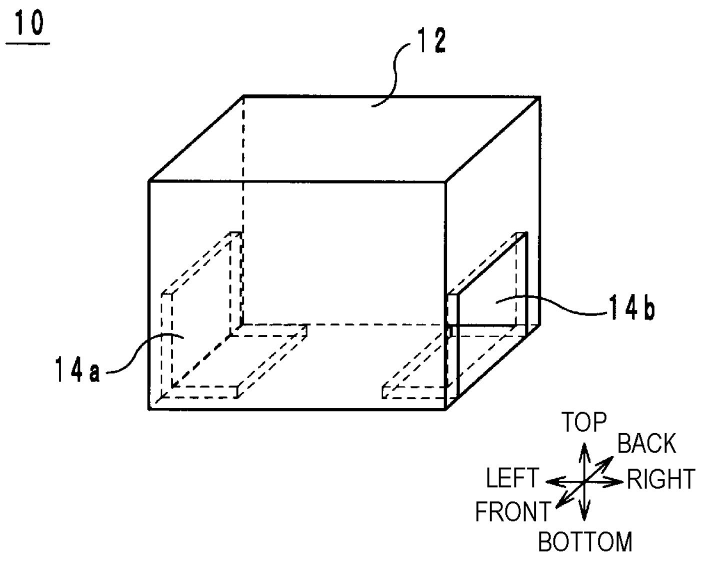
FIG. 1 is an external perspective view of an electronic component 10 according to an embodiment.
Figure 2:
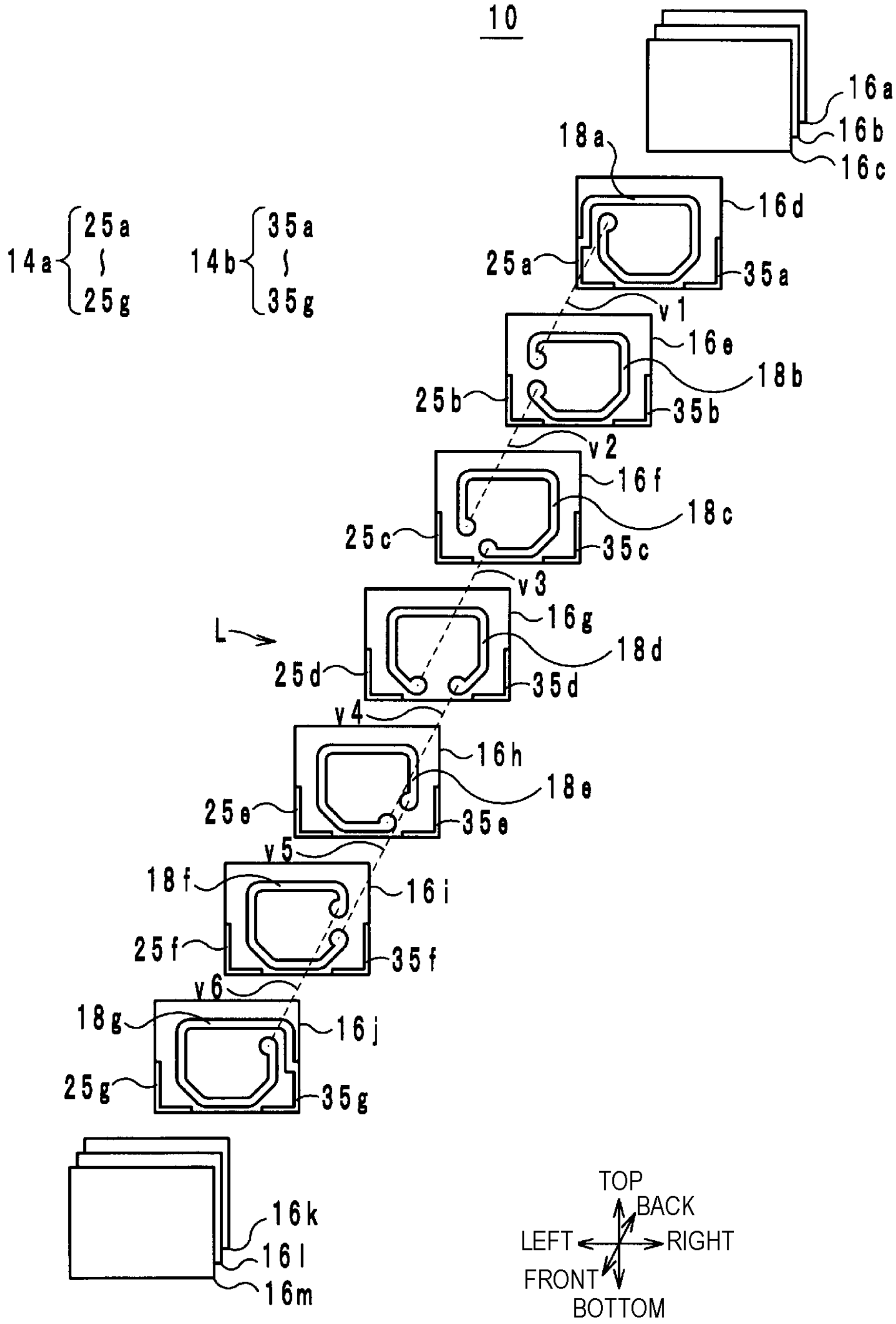
FIG. 2 is an exploded perspective view of the electronic component 10 illustrated in FIG. 1.

The configuration of the electronic component according to the embodiment will be described hereinafter with reference to the drawings. FIG. 1 is an external perspective view of an electronic component 10 according to the embodiment. FIG. 2 is an exploded perspective view of the electronic component 10 illustrated in FIG. 1. In the following, a lamination direction of the electronic component 10 is defined as a front-back direction. When viewed in plan view from the front, a direction in which long sides of the electronic component 10 extend is defined as a left-right direction and a direction in which short sides of the electronic component 10 extend is defined as an up-down direction.

As illustrated in FIGS. 1 and 2, the electronic component 10 includes a multilayer body 12, outer electrodes 14*a* and 14*b*, and an inductor L.

As illustrated in FIG. 2, the multilayer body 12 is formed by laminating a plurality of insulation layers 16*a*-16 m to be arranged in that order from back to front, and takes on a parallelepiped shape by adding the outer electrodes 14*a* and 14*b*, which will be mentioned later. Hereinafter, two opposite sides of the multilayer body 12 in the front-back direction will be called side surfaces, and two opposite sides of the multilayer body 12 in the left-right direction will be called end surfaces. A surface of the multilayer body 12 on a top side thereof will be called a top surface, and a surface on a bottom side of the multilayer body 12 will be called a bottom surface. The bottom surface of the multilayer body 12 serves as a mounting surface that faces a circuit board when mounting the electronic component 10 on the circuit board. The two end surfaces, the top surface, and the bottom surface are surfaces formed by contiguous outer edges of the insulation layers 16*a*-16 m.

As illustrated in FIG. 2, the insulation layers 16*a*-16*m* are rectangular in shape, and are formed of an insulating material that has borosilicate glass as a primary component, for example. The insulation layer 16*a* or the insulation layer 16*m* may be colored with a different color than the insulation layers 16*b*-16*l* to make it possible to distinguish the directions of the electronic component 10. The vicinities of the lower-right and lower-left corners of the insulation layers 16*e*-16*j* are cut out in an L shape. Hereinafter, front-side surfaces of the insulation layers 16*a*-16*m* will be called front surfaces, and back-side surfaces of the insulation layers 16*a*-16*m* will be called back surfaces.

As illustrated in FIG. 1, the outer electrode 14*a* is embedded in the left side surface and bottom surface of the multilayer body 12, and is exposed on the outside of the multilayer body 12 across the left side surface and bottom surface. In other words, when viewed in plan view from the front, the outer electrode 14*a* has an L shape. As illustrated in FIG. 2, the outer electrode 14*a* includes outer conductor layers 25*a*-25*g*.

As illustrated in FIG. 2, the outer conductor layer 25*a* is provided on the front surface of the insulation layer 16*d*. The outer conductor layer 25*a* has an L shape, and when viewed in plan view from the front, makes contact with a left short side and a bottom long side of the insulation layer 16*d*.

As illustrated in FIG. 2, the outer conductor layers 25*b*-25*g* are laminated so as to pass through the insulation layers 16*e*-16*j* in the front-back direction and be electrically connected. The outer conductor layer 25*a*, meanwhile, is laminated to a back side of the outer conductor layer 25*b*. The outer conductor layers 25*b*-25*g* have the same L shape as the outer conductor layer 25*a*, and when viewed in plan view from the front, are provided within the L-shaped cutout areas in the vicinities of the lower-left corners of the insulation layers 16*e*-16*j*.

The parts of the outer conductor layers 25*a*-25*g* exposed on the outside of the multilayer body 12 are plated with Sn and Ni to prevent corrosion.

The outer electrode 14*a* configured as described above has a rectangular shape on the left end surface, and a rectangular shape on the bottom surface as well.

As illustrated in FIG. 1, the outer electrode 14*b* is embedded in the right side surface and bottom surface of the multilayer body 12, and is exposed on the outside of the multilayer body 12 across the right side surface and bottom surface. In other words, when viewed in plan view from the front, the outer electrode 14*b* has an L shape. As illustrated in FIG. 2, the outer electrode 14*b* includes outer conductor layers 35*a*-35*g*.

As illustrated in FIG. 2, the outer conductor layer 35*a* is provided on the front surface of the insulation layer 16*d*. The outer conductor layer 35*a* has an L shape, and when viewed in plan view from the front, makes contact with a right short side and a bottom long side of the insulation layer 16*d*.

As illustrated in FIG. 2, the outer conductor layers 35*b*-35*g* are laminated so as to pass through the insulation layers 16*e*-16*j* in the front-back direction and be electrically connected. The outer conductor layer 35*a*, meanwhile, is laminated to a back side of the outer conductor layer 35*b*. The outer conductor layers 35*b*-35*g* have the same L shape as the outer conductor layer 35*a*, and when viewed in plan view from the front, are provided within the L-shaped cutout areas in the vicinities of the lower-right corners of the insulation layers 16*e*-16*j*.

The parts of the outer conductor layers 35*a*-35*g* exposed on the outside of the multilayer body 12 are plated with Sn and Ni to prevent corrosion.

The outer electrode 14*b* configured as described above has a rectangular shape on the right end surface, and a rectangular shape on the bottom surface as well.

The insulation layers 16*a*-16*d* and 16*k*-16*m* are laminated onto the front and back sides, respectively, of the outer electrodes 14*a* and 14*b*. As a result, the outer electrodes 14*a* and 14*b* are not exposed on the two side surfaces.

The inductor L includes inductor conductor layers 18*a*-18*g* and via hole conductors v1-v6, and when viewed in plan view from the front, forms a helical shape that progresses from the back toward the front while winding clockwise.

The inductor conductor layers 18*a*-18*g* are provided on the front surfaces of the insulation layers 16*d*-16*j*. Accordingly, the inductor conductor layer 18*b* is adjacent to the inductor conductor layer 18*a* on the front side thereof. The inductor conductor layers 18*a* and 18*g* have one turn or greater, whereas the inductor conductor layers 18*b*-18*f* have slightly less than one turn. Hereinafter, an end portion of the inductor conductor layers 18*a*-18*g* on an upstream side in the clockwise direction will be called an upstream end, and an end portion of the inductor conductor layers 18*a*-18*g* on a downstream side in the clockwise direction will be called a downstream end.

When viewed in plan view from the front, the inductor conductor layers 18*b*-18*f* overlap with each other and form a hexagonal annular path. Accordingly, the inductor conductor layers 18*b*-18*f* are not directly connected to the outer conductor layers 25*a*-25*g* and 35*a*-35*g* (in other words, to the outer electrodes 14*a* and 14*b*). Parts of the inductor conductor layers 18*a* and 18*g* also overlap with the hexagonal annular path. However, the upstream end of the inductor conductor layer 18*a* is directly connected to the outer conductor layer 25*a* (in other words, to the outer electrode 14*a*). Accordingly, the vicinity of the upstream end of the inductor conductor layer 18*a* does not overlap with the hexagonal annular path. Additionally, the downstream end of the inductor conductor layer 18*g* is directly connected to the outer conductor layer 35*g* (in other words, to the outer electrode 14b). Accordingly, the vicinity of the downstream end of the inductor conductor layer 18g does not overlap with the hexagonal annular path. However, the inductor conductor layers 18a and 18g are not lead out to the exterior of the multilayer body 12. The inductor conductor layers 18a-18g as described thus far are made from a conductive material that has Ag as a primary component, for example.

Each of the via hole conductors v1-v6 passes through the corresponding layer of the insulation layers 16e-16j in the front-back direction respectively. The via hole conductors v1-v6 are made from a conductive material that has Ag as a primary component, for example. The via hole conductor v1 connects the downstream end of the inductor conductor layer 18a to the upstream end of the inductor conductor layer 18b. The via hole conductor v2 connects the downstream end of the inductor conductor layer 18b to the upstream end of the inductor conductor layer 18c. The via hole conductor v3 connects the downstream end of the inductor conductor layer 18c to the upstream end of the inductor conductor layer 18d. The via hole conductor v4 connects the downstream end of the inductor conductor layer 18d to the upstream end of the inductor conductor layer 18e. The via hole conductor v5 connects the downstream end of the inductor conductor layer 18e to the upstream end of the inductor conductor layer 18f. The via hole conductor v6 connects the downstream end of the inductor conductor layer 18f to the upstream end of the inductor conductor layer 18g.

In the inductor L configured as described thus far, the via hole conductor v1 that connects the inductor conductor layer 18a and the inductor conductor layer 18b adjacent to each other in the front-back direction is, when viewed in plan view from the front, provided closer to the outer electrode 14a than the outer electrode 14b, and, when viewed in plan view from the normal direction of the left end surface of the multilayer body 12 (in other words, from the left side), does not overlap with the outer electrode 14a. More specifically, the via hole conductor v1 is, when viewed in plan view from the front, positioned further to the left than a straight line passing through the center of the left-right direction of the multilayer body 12 in the up-down direction. Furthermore, the via hole conductor v1 is located further upward than an upper end of the outer electrode 14a.

Additionally, in the inductor L, the via hole conductor v6 that connects the inductor conductor layer 18f and the inductor conductor layer 18g adjacent to each other in the front-back direction is, when viewed in plan view from the front, provided closer to the outer electrode 14b than the outer electrode 14a, and, when viewed in plan view from the normal direction of the right end surface of the multilayer body 12 (in other words, from the right side), does not overlap with the outer electrode 14b. More specifically, the via hole conductor v6 is, when viewed in plan view from the front, positioned further to the right than a straight line passing through the center of the left-right direction of the multilayer body 12 in the up-down direction. Furthermore, the via hole conductor v6 is located further upward than an upper end of the outer electrode 14b.

(Method of Manufacturing Electronic Component)

A method of manufacturing the electronic component 10 according to the present embodiment will be described hereinafter with reference to the drawings. FIGS. 3 to 8 are plan views illustrating the electronic component 10 during manufacture.

Figure 3:
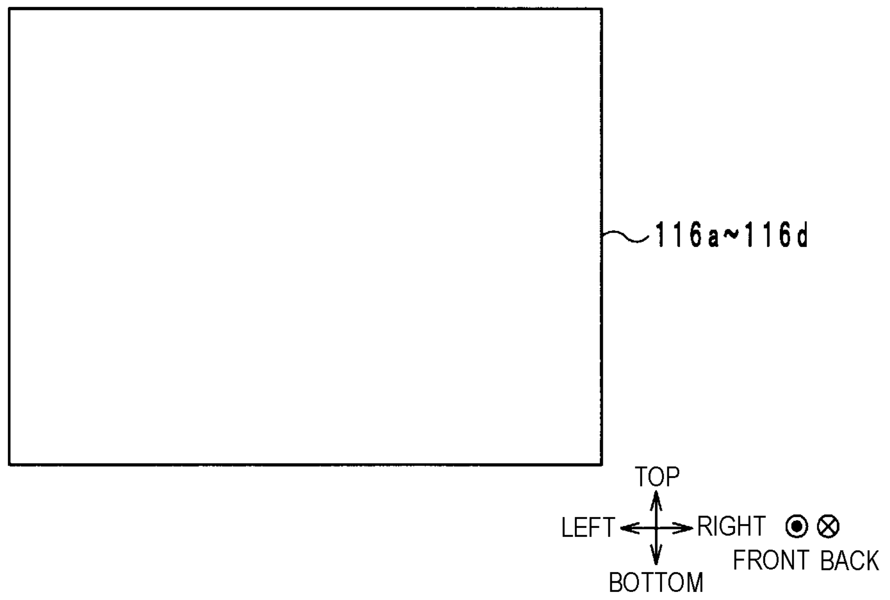
FIG. 3 is a plan view of the electronic component 10 during manufacture.

First, as illustrated in FIG. 3, insulating paste layers 116a-116d are formed through the repeated spreading by screen printing of an insulating paste having borosilicate glass as a primary component. The insulating paste layers 116a-116d are insulating paste layers that will serve as the insulation layers 16a-16d, which are outer layer insulation layers located further in an outer side portion than the inductor L.

Figure 4:
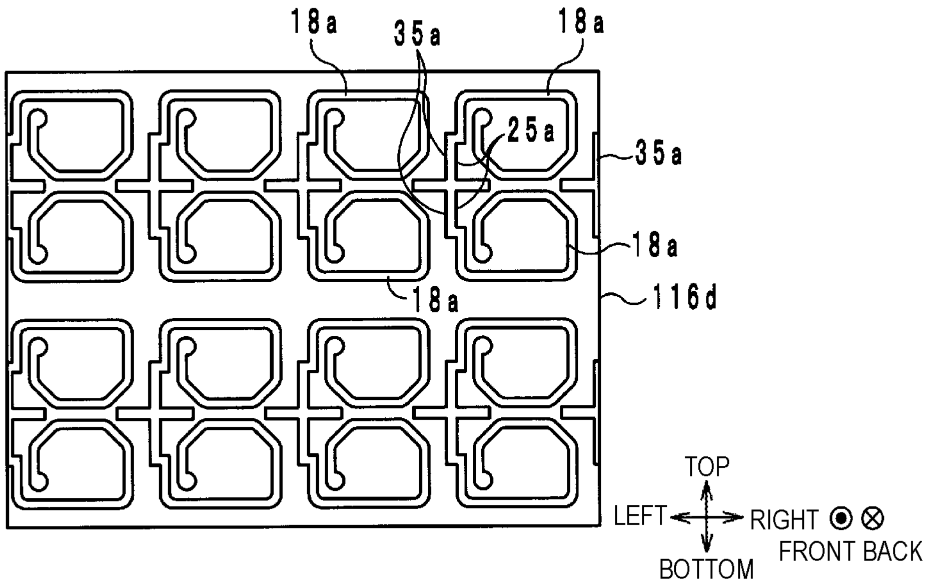
FIG. 4 is a plan view of the electronic component 10 during manufacture.

Next, as illustrated in FIG. 4, the inductor conductor layer 18a and the outer conductor layers 25a and 35a are formed through photolithography. Specifically, a photosensitive conductive paste having Ag as a primary metal component is spread through screen printing so as to form a conductive paste layer on the insulating paste layer 116d. Furthermore, the conductive paste layer is irradiated with ultraviolet light or the like through a photomask and then developed using an alkali solution or the like. The inductor conductor layer 18a and the outer conductor layers 25a and 35a are formed on the insulating paste layer 116d as a result.

Figure 5:
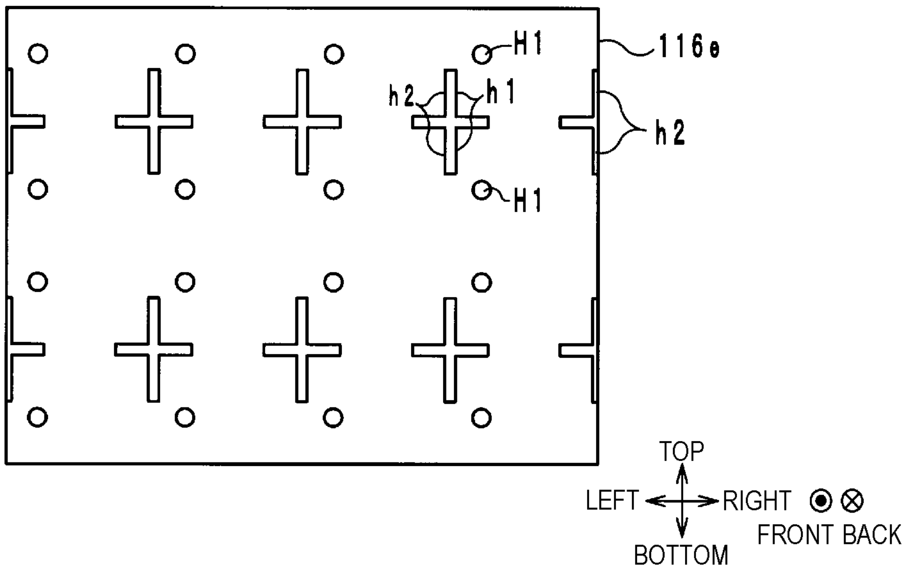
FIG. 5 is a plan view of the electronic component 10 during manufacture.

Next, as illustrated in FIG. 5, an insulating paste layer 116e, in which openings h1 and h2 and holes H1 are provided, is formed through photolithography. Specifically, a photosensitive insulating paste is spread through screen printing so as to form the insulating paste layer 116e on the insulating paste layer 116d. Furthermore, the insulating paste layer is irradiated with ultraviolet light or the like through a photomask and then developed using an alkali solution or the like. The insulating paste layer 116e is a paste layer that will serve as the insulation layer 16e. The openings h1 and h2 form L shapes having the same shape as the outer conductor layers 25b and 35b, respectively. A plus-shaped opening is formed by two of the openings h1 and two of the openings h2 connecting. The holes H1, meanwhile, are round holes in which the via hole conductor v1 will be formed.

Figure 6:
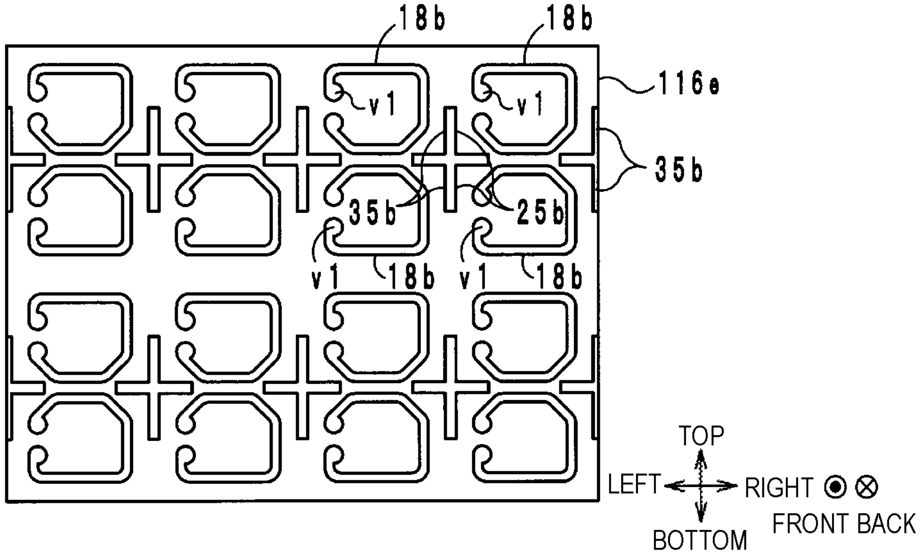
FIG. 6 is a plan view of the electronic component 10 during manufacture.

Next, as illustrated in FIG. 6, the inductor conductor layer 18b, the outer conductor layers 25b and 35b, and the via hole conductor v1 are formed through photolithography. Specifically, a photosensitive conductive paste having Ag as a primary metal component is spread through screen printing so as to form a conductive paste layer on the insulating paste layer 116e. Furthermore, the conductive paste layer is irradiated with ultraviolet light or the like through a photomask and then developed using an alkali solution or the like. The inductor conductor layer 18b is formed on the insulating paste layer 116e as a result. The outer conductor layers 25b and 35b are formed in the openings h1 and h2, respectively. The via hole conductor v1 is formed in the holes H1.

Figure 7:
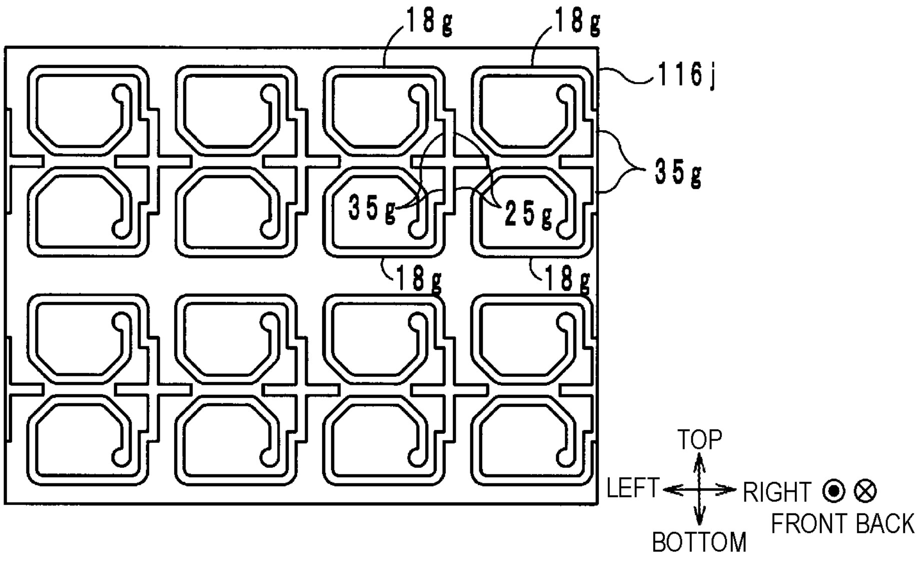
FIG. 7 is a plan view of the electronic component 10 during manufacture.

Thereafter, the insulating paste layers 116f-116j, the inductor conductor layers 18c-18g, the outer conductor layers 25c-25g and 35c-35g, and the via hole conductors v2-v6 are formed by repeating the processes illustrated in FIGS. 5 and 6. FIG. 7 is a diagram illustrating a state following the formation of the inductor conductor layer 18g and the outer conductor layers 25g and 35g.

Figure 8:
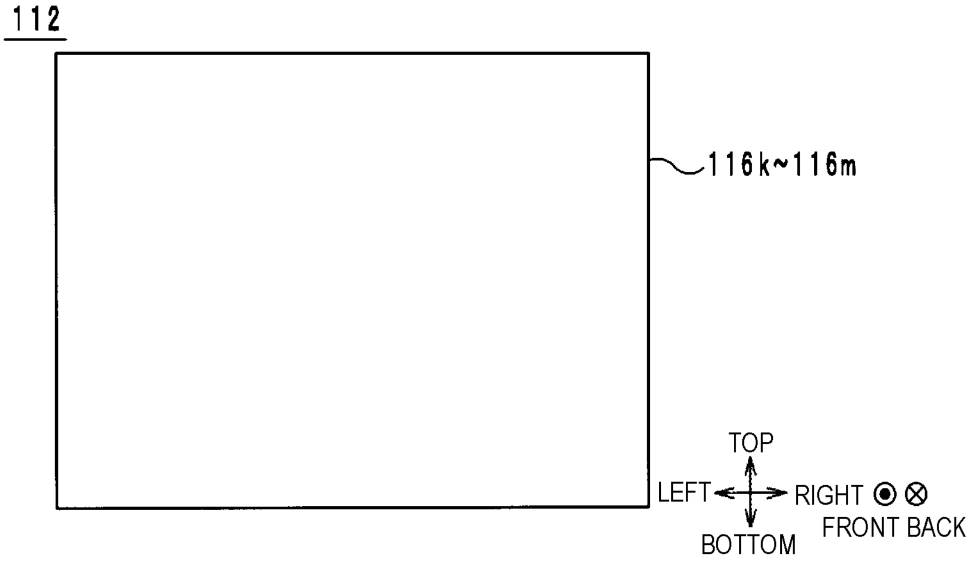
FIG. 8 is a plan view of the electronic component 10 during manufacture.

Next, as illustrated in FIG. 8, insulating paste layers 116k-116m are formed through the repeated spreading by screen printing of an insulating paste. The insulating paste layers 116k-116m are insulating paste layers that will serve as the insulation layers 16k-16m, which are outer layer insulation layers located further in an outer side portion than the inductor L. A mother multilayer body 112 is obtained from the processes described thus far.

Next, the mother multilayer body 112 is cut into a plurality of unfired multilayer bodies 12 with a dicing machine or the like. In the process of cutting the mother multilayer body 112, the outer electrodes 14a and 14b are exposed on the multilayer body 12 from cut faces formed by the cutting.

The unfired multilayer body 12 is then fired under predetermined conditions to obtain the multilayer body 12. The multilayer body 12 is furthermore subjected to barrel finishing.

Finally, the parts of the outer electrodes 14*a* and 14*b* exposed on the multilayer body 12 are plated with Ni and Sn. The electronic component 10 is completed through the process described thus far.

(Effects)

According to the electronic component 10 configured as described above, a high Q value can be achieved. More specifically, in the electronic component 10, the via hole conductor v1 connects the inductor conductor layer 18*a* and the inductor conductor layer 18*b*, and thus the electric potential of the via hole conductor v1 is comparatively close to the electric potential of the inductor conductor layer 18*a*. Furthermore, the inductor conductor layer 18*a* is connected to the outer electrode 14*a*, and thus the electric potential of the via hole conductor v1 is comparatively close to that of the outer electrode 14*a* as well. However, the electric potential of the via hole conductor v1 can differ greatly from the electric potential of the outer electrode 14*b*. When there is such a great difference in potentials between the via hole conductor v1 and the outer electrode 14*b*, a high stray capacitance is formed therebetween, which negatively influences the inductor L.

Accordingly, in the electronic component 10, the via hole conductor v1 is, when viewed in plan view from the front, provided closer to the outer electrode 14*a* than the outer electrode 14*b*. In other words, the via hole conductor v1 is positioned so as to be distanced from the outer electrode 14*b*. As a result, a high stray capacitance is prevented from being formed between the via hole conductor v1 and the outer electrode 14*b*, which have a large potential difference. As a result, negative influence on the inductor L by the stray capacitance is reduced, which makes it possible to achieve a high Q value in the inductor L.

Furthermore, according to the electronic component 10, a high Q value can be achieved for the following reasons as well. Specifically, when the electronic component 10 is viewed in plan view from the left, the via hole conductor v1 does not overlap with the outer electrode 14*a*. This reduces stray capacitance arising between the via hole conductor v1 and the outer electrode 14*a*. As a result, a drop in the self-resonating frequency of the inductor L caused by stray capacitance arising between the via hole conductor v1 and the outer electrode 14*a* can be suppressed, and a high Q value can be achieved in the inductor L.

Figure 9:
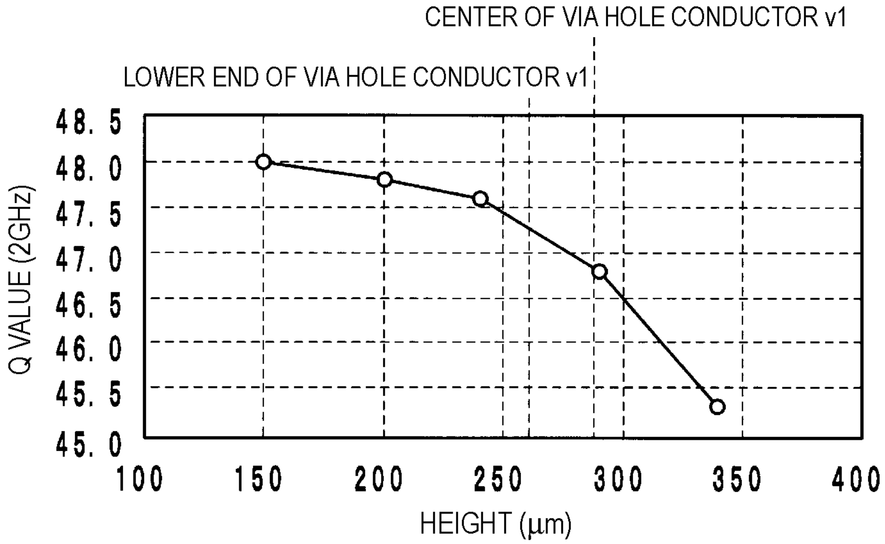
FIG. 9 is a graph illustrating results of a simulation.

Here, the inventors of the present disclosure carried out the computer simulation described next to further clarify the effects provided by the electronic component 10. The size of the electronic component 10 used in the computer simulation was L: 0.6 mm, W: 0.3 mm, and T: 0.4 mm. To be more specific, the Q value of the inductor L at 2 GHz was measured while varying the height of the outer electrodes 14*a* and 14*b* from the bottom surface from 150 μm to 340 μm. The position of the center of the via hole conductor v1 in the up-down direction was fixed at 280 μm from the bottom surface at this time. Thus the position of the lower end of the via hole conductor v1 in the up-down direction was 260 μm from the bottom surface. FIG. 9 is a graph illustrating results of the simulation. The vertical axis represents the Q value, and the horizontal axis represents the height of the outer electrodes 14*a* and 14*b*.

As indicated in FIG. 9, a comparatively good Q value is achieved in the case where the outer electrodes 14*a* and 14*b* are lower than the lower end of the via hole conductor v1. However, it can be seen that the Q value drops drastically once the outer electrodes 14*a* and 14*b* become higher than the lower end of the via hole conductor v1. In other words, the Q value of the inductor L worsens drastically when the via hole conductor v1 overlaps with the outer electrodes 14*a* and 14*b*, when viewed in plan view from the left. Thus it can be seen from this computer simulation that the electronic component 10 is capable of achieving a high Q value.

(First Variation)

Figure 10:
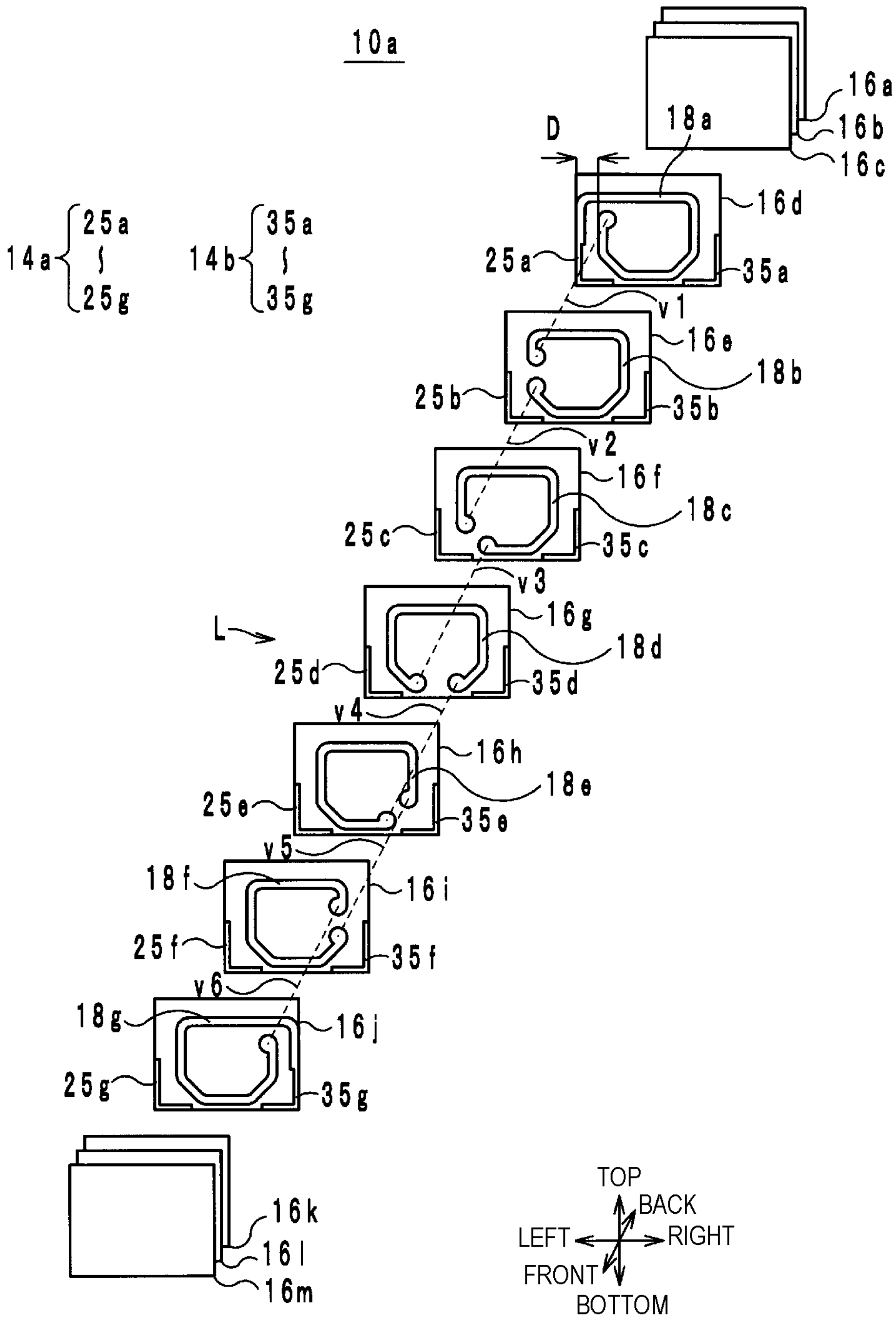
FIG. 10 is an exploded perspective view of an electronic component 10*a*.
Figure 11:
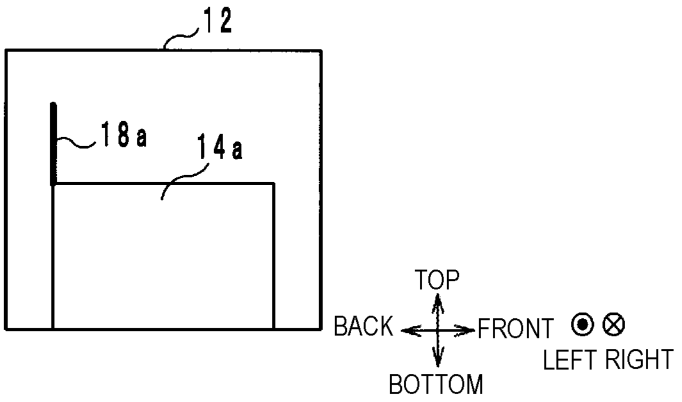
FIG. 11 is a diagram illustrating a plan view of the electronic component 10*a* from a left side.
Figure 12:
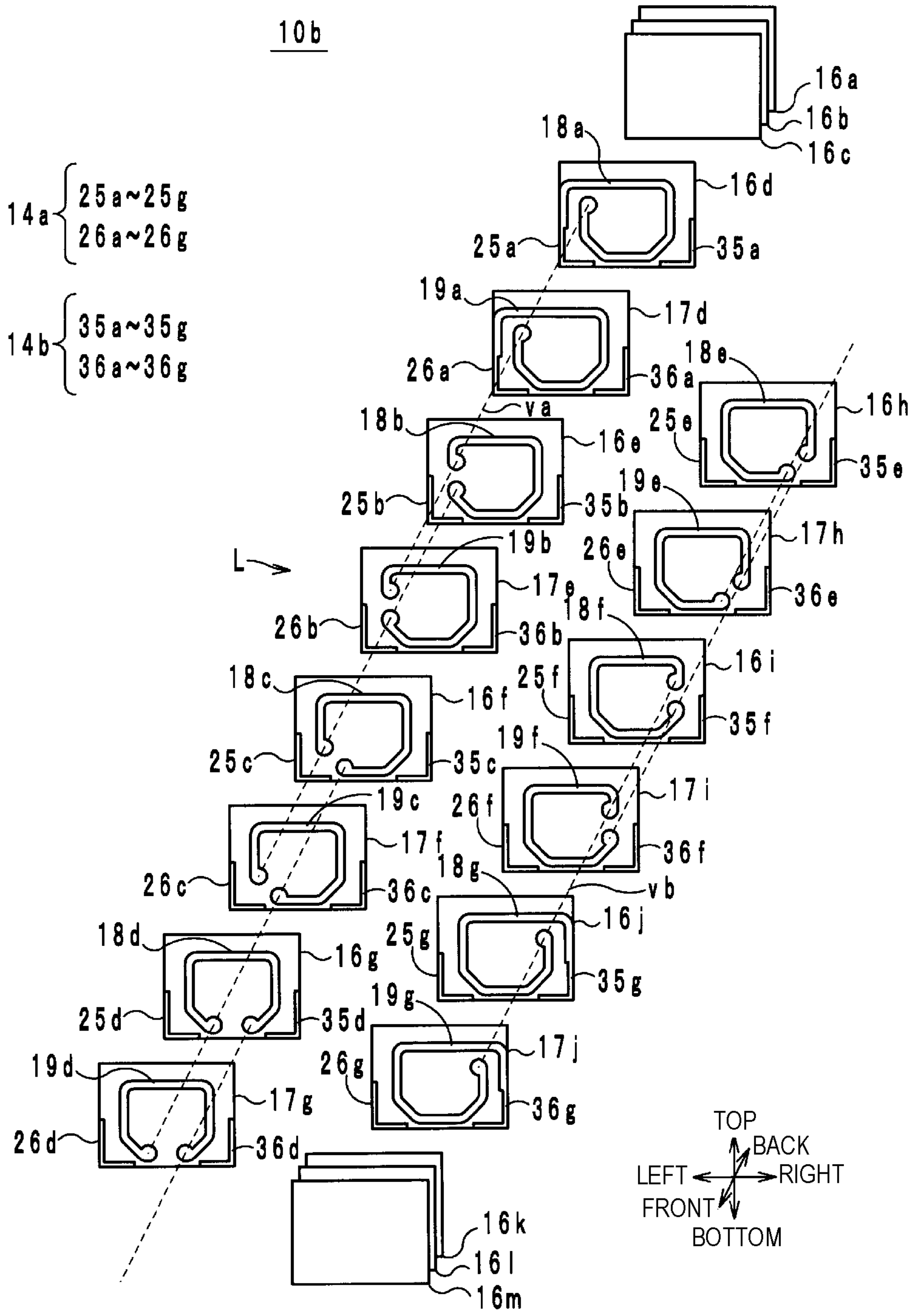
FIG. 12 is an exploded perspective view of an electronic component 10*b*.
Figure 13:
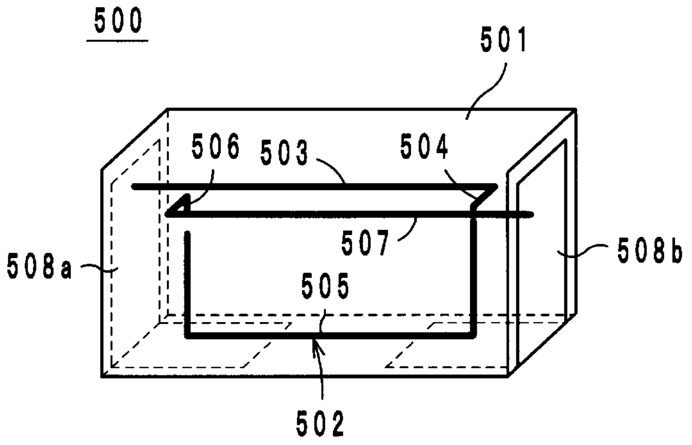
FIG. 13 is a perspective view of an electronic component 500 disclosed in Japanese Unexamined Patent Application Publication No. 2012-79870.

Next, an electronic component 10*a* according to a first variation will be described with reference to the drawings. FIG. 10 is an exploded perspective view of the electronic component 10*a*. FIG. 11 is a diagram illustrating a plan view of the electronic component 10*a* from the left side.

The electronic component 10*a* differs from the electronic component 10 in that parts of the inductor conductor layers 18*a* and 18*g* are exposed on the left end surface and the right end surface of the multilayer body 12. The electronic component 10*a* will be described next, focusing on this difference. The remainder of the configuration of the electronic component 10*a* is the same as that of the electronic component 10 and thus will not be described.

In the electronic component 10, the inductor conductor layers 18*a* and 18*g* are provided within the multilayer body 12 and are not exposed on the multilayer body 12. However, in the electronic component 10*a*, the inductor conductor layer 18*a* is exposed on the left end surface of the multilayer body 12, across a predetermined section from a part directly connected to the outer electrode 14*a*. Accordingly, the inductor conductor layer 18*a* extends linearly upward from an upper-back corner of the outer electrode 14*a* on the left end surface of the multilayer body 12, as illustrated in FIG. 11.

Additionally, in the electronic component 10*a*, the inductor conductor layer 18*g* is exposed on the right end surface of the multilayer body 12, across a predetermined section from a part directly connected to the outer electrode 14*b*. Accordingly, the inductor conductor layer 18*g* extends linearly upward from an upper-front corner of the outer electrode 14*b* on the right end surface of the multilayer body 12. As such, the shapes of the outer electrode 14*a* and the inductor conductor layer 18*a* when viewed in plan view from the left substantially match the shapes of the outer electrode 14*b* and the inductor conductor layer 18*g* when viewed in plan view from the right.

Here, a border between the outer electrode 14*a* and the inductor conductor layer 18*a* on the left end surface of the multilayer body 12 will be described. The outer electrode 14*a* is a part in which the plurality of outer conductor layers 25*a*-25*g* are laminated together to form a (rectangular) assembly on the left end surface of the multilayer body 12. On the other hand, the inductor conductor layer 18*a* is a part extending linearly from this assembly on the left end surface of the multilayer body 12. Note that the same applies to a border between the outer electrode 14*b* and the inductor conductor layer 18*g* on the right end surface of the multilayer body 12.

According to the electronic component 10*a* configured as described above, a higher Q value can be achieved, in the same manner as with the electronic component 10.

Additionally, according to the electronic component 10*a*, parts of the inductor conductor layers 18*a* and 18*g* are exposed on the left end surface and the right end surface of the multilayer body 12. As such, inner diameters of the inductor conductor layers 18*a* and 18*g* of the electronic component 10*a* are greater than the inner diameters of the inductor conductor layers 18*a* and 18*g* of the electronic component 10. An inductance value of the inductor L in the electronic component 10*a* is thus greater than an inductance value of the inductor L in the electronic component 10.

Here, the inventors of the present disclosure carried out a computer simulation to calculate the inductance values of the inductors L in the electronic component 10 and the electronic component 10*a*. The conditions of the simulation are as indicated below.

distance D from left end of annular path to left end surface (see FIG. 10): 59.7 μm line width of inductor conductor layers 18*a*-18*g*: 30 μm thickness of inductor conductor layers 18*a*-18*g*: 11.5 μm thickness of insulation layers 16*a*-16*g*: 14.5 μm number of turns in inductor L: 8.5 turns While the inductance value of the inductor L in the electronic component 10 at 500 MHz was 22.9 nH, the inductance value of the inductor L in the electronic component 10*a* at 500 MHz was 25.3 nH. It can thus be seen that the electronic component 10*a* can achieve a higher inductance value than the electronic component 10 from this computer simulation as well.

(Second Variation)

Next, an electronic component 10*b* according to a second variation will be described with reference to the drawings. FIG. is an exploded perspective view of the electronic component 10*b*.

The electronic component 10*b* differs from the electronic component 10*a* in that the inductor L has a double-helix structure. The electronic component 10*b* will be described next, focusing on this difference. The remainder of the configuration of the electronic component 10*b* is the same as that of the electronic component 10*a* and thus will not be described.

The inductor L of the electronic component 10*b* includes inductor conductor layers 18*a*-18*g* and 19*a*-19*g*. The inductor conductor layers 19*a*-19*g* have the same shapes as the inductor conductor layers 18*a*-18*g*, respectively. The inductor conductor layers 18*a*, 19*a*, 18*b*, 19*b*, 18*c*, 19*c*, 18*d*, 19*d*, 18*e*, 19*e*, 18*f*, 19*f*, 18*g*, and 19*g* are arranged in that order from back to front. The inductor conductor layer 18*a* and the inductor conductor layer 19*a* are electrically connected in parallel to each other at both ends thereof. The inductor conductor layer 18*b* and the inductor conductor layer 19*b* are electrically connected in parallel to each other at both ends thereof. The inductor conductor layer 18*c* and the inductor conductor layer 19*c* are electrically connected in parallel to each other at both ends thereof. The inductor conductor layer 18*d* and the inductor conductor layer 19*d* are electrically connected in parallel to each other at both ends thereof. The inductor conductor layer 18*e* and the inductor conductor layer 19*e* are electrically connected in parallel to each other at both ends thereof. The inductor conductor layer 18*f* and the inductor conductor layer 19*f* are electrically connected in parallel to each other at both ends thereof. The inductor conductor layer 18*g* and the inductor conductor layer 19*g* are electrically connected in parallel to each other at both ends thereof.

In the inductor L of the electronic component 10*b* configured as described thus far, a via hole conductor va that connects the inductor conductor layer 19*a* and the inductor conductor layer 18*b* adjacent to each other is, when viewed in plan view from the front, provided closer to the outer electrode 14*a* than the outer electrode 14*b*, and, when viewed in plan view from the normal direction of the left end surface (in other words, from the left side), does not overlap with the outer electrode 14*a*. More specifically, the via hole conductor va is, when viewed in plan view from the front, positioned further to the left from a straight line passing through the center of the left-right direction of the multilayer body 12 in the up-down direction. Furthermore, the via hole conductor va is located further upward than an upper end of the outer electrode 14*a*.

Additionally, in the inductor L, a via hole conductor vb that connects the inductor conductor layer 19*f* and the inductor conductor layer 18*g* adjacent to each other is, when viewed in plan view from the front, provided closer to the outer electrode 14*b* than the outer electrode 14*a*, and, when viewed in plan view from the normal direction of the right end surface (in other words, from the right side), does not overlap with the outer electrode 14*b*. More specifically, the via hole conductor vb is, when viewed in plan view from the front, positioned further to the right than a straight line passing through the center of the left-right direction of the multilayer body 12 in the up-down direction. Furthermore, the via hole conductor vb is located further upward than an upper end of the outer electrode 14*b*.

Additionally, in the electronic component 10*b*, the inductor conductor layers 18*a* and 19*a* are exposed on the left end surface of the multilayer body 12, across a predetermined section from a part connected to the outer electrode 14*a*. Accordingly, the inductor conductor layers 18*a* and 19*a* extend parallel, linearly upward from the vicinity of an upper-back corner of the outer electrode 14*a* on the left end surface of the multilayer body 12.

Additionally, in the electronic component 10*b*, the inductor conductor layers 18*g* and 19*g* are exposed on the right end surface of the multilayer body 12, across a predetermined section from a part connected to the outer electrode 14*b*. Accordingly, the inductor conductor layers 18*g* and 19*g* extend parallel, linearly upward from the vicinity of an upper-front corner of the outer electrode 14*b* on the right end surface of the multilayer body 12. As such, the shapes of the outer electrode 14*a* and the inductor conductor layers 18*a* and 19*a* when viewed in plan view from the left substantially match the shapes of the outer electrode 14*b* and the inductor conductor layers 18*g* and 19*g* when viewed in plan view from the right.

According to the electronic component 10*b* configured as described above, a higher Q value can be achieved and a high inductance value can be achieved, in the same manner as with the electronic component 10*a*.

Additionally, in the electronic component 10*b*, the inductor L has a double-helix structure, and thus a DC resistance value of the inductor L can be reduced.

Other Embodiments

The electronic component according to the present disclosure is not limited to the above-described electronic components 10, 10*a*, and 10*b*, and can be modified without departing from the essential spirit thereof.

The configurations of the electronic components 10, 10*a*, and 10*b* may be combined as desired.

The inductor conductor layers 18*a*-18*g* and 19*a*-19*g* of the electronic components 10, 10*a*, and 10*b* may have spiral shapes having one or more turns. This makes it possible to increase the inductance value of the inductor L.

Additionally, although the electronic components 10, 10*a*, and 10*b* are made through a photolithography process, the components may be made through a printing process, a sequential pressure-bonding process, or the like.

Additionally, although the insulation layers 16*a*-16*m* and 17*d*-17*j* are made from borosilicate glass in the electronic components 10, 10_a_, and 10_b_, these layers may be made from magnetic ceramics, nonmagnetic ceramics, or the like.

Additionally, although the outer electrode 14_a_ has a rectangular shape when viewed in plan view from the left, the outer electrode 14_a_ may have a shape aside from a rectangle. Likewise, although the outer electrode 14_b_ has a rectangular shape when viewed in plan view from the right, the outer electrode 14_b_ may have a shape aside from a rectangle.

Additionally, the outer electrodes 14_a_ and 14_b_ may be provided on surfaces of the multilayer body 12 rather than being embedded in the multilayer body 12. In this case, the outer electrodes 14_a_ and 14_b_ are formed by first forming base electrodes by applying a conductive paste having silver or the like as a primary component to the surfaces of the multilayer body 12 and firing the conductive paste, and then plating the base electrodes with Ni and Sn.

The invention claimed is:

1. An electronic component comprising:

a multilayer body formed by laminating a plurality of insulation layers in a lamination direction, the multilayer body having a top surface, a bottom surface, a first end surface, and a second end surface each formed by outer edges of the insulation layers, the top surface opposite from the bottom surface, and the second end surface opposite from the first end surface;

an inductor, including a plurality of inductor conductor layers extending linearly and laminated with the insulation layers, the plurality of inductor conductor layers being connected by a plurality of via hole conductors that pass through ones of the insulation layers in the lamination direction, the inductor having a helical shape progressing from one side to another side in the lamination direction while winding;

a first outer electrode connected to the inductor and having an L-shape provided on the bottom surface and the first end surface; and a second outer electrode connected to the inductor and having an L-shape provided on the bottom surface and the second end surface, wherein the plurality of inductor conductor layers include a first inductor conductor layer directly connected to a part of the first outer electrode provided on the first end surface, and a second inductor conductor layer not directly connected to the first outer electrode and adjacent to the first inductor conductor layer on the other side in the lamination direction, the plurality of via hole conductors including a first via hole conductor, connecting the first inductor conductor layer and the second inductor conductor layer, that is, when viewed in plan view from the lamination direction, provided closer to the first outer electrode than the second outer electrode, a distance from the first via hole conductor to the top surface of the multilayer body is less than a distance from an uppermost surface of the first outer electrode to the top surface of the multilayer body, and an end of the first inductor conductor layer having the first via hole conductor is extended in a direction toward the top surface of the multilayer body from the part of the first outer electrode.

2. The electronic component according to claim 1, wherein the first outer electrode has a rectangular shape on the first end surface.

3. The electronic component according to claim 1, wherein the first inductor conductor layer is exposed on the first end surface across a predetermined section from a part directly connected to the first outer electrode.

4. The electronic component according to claim 1, wherein the first inductor conductor layer has one or more turns.

5. The electronic component according to claim 1, the end of the first inductor conductor layer having the first via hole conductor extends past the uppermost surface of the first outer electrode in the direction toward the top surface of the multilayer body.

* * * * *